United States Patent [19]

Colbert et al.

[11] Patent Number: 5,260,552
[45] Date of Patent: Nov. 9, 1993

[54] SLOT READER WITH REMOVABLE MANUAL SCANNING WAND

[76] Inventors: Bryan K. Colbert, 220 Grove Ave., Warwick, R.I. 02889; John R. Decesare, 76 Ash St., Lincoln, R.I. 02865; Vincent P. Falso, 700 Shippeetown Rd., East Greenwich, R.I. 02818; William S. Hoopes, 234 Wayland Ave., Apt. 5, Providence, R.I. 02906

[21] Appl. No.: 697,651

[22] Filed: May 8, 1991

[51] Int. Cl.⁵ .................................. G06K 13/00
[52] U.S. Cl. ............................. 235/482; 235/462; 235/472
[58] Field of Search ................ 235/462, 472, 482

[56] References Cited

U.S. PATENT DOCUMENTS

| | | | |
|---|---|---|---|
| 4,457,016 | 6/1984 | Pfeffer | 235/483 |
| 4,766,297 | 8/1988 | McMillan | 235/462 |
| 4,795,896 | 1/1989 | Prell | 235/482 |
| 4,916,441 | 4/1990 | Gombrich | 235/462 |
| 5,079,412 | 1/1992 | Sugiyama | 235/383 |

*Primary Examiner*—John Shepperd
*Attorney, Agent, or Firm*—Eckert Seamans Cherin & Mellott

[57] ABSTRACT

A device for reading data encoded on a form has a removable scanning wand and a housing defining a slot for receiving the form. The wand functions as the input means of a slot reader when received in the housing, and is useful independently of the housing as a hand held scanning wand. The slot of the housing receives the form so as to position data on the form at a predetermined position and the wand is directed at the predetermined position when received in the housing. The wand, or other similar data read head for bar code, magnetic strips, OCR characters or the like, is preferably positively positioned in the housing by a spring biased clip releasable by finger pressure. The wand can be coupled by a connecting lead to a further terminal apart from the housing, to which terminal the housing can preferably be attached to add a slot reader capability. Alternatively, the wand can be coupled by a connecting lead to a data discriminator in the housing, which data discriminator stores and/or transmits detected data to a further device.

15 Claims, 2 Drawing Sheets

SLOT READER WITH REMOVABLE MANUAL SCANNING WAND

BACKGROUND OF THE INVENTION

1. Field of the Invention

The invention relates to the field of devices for reading data from cards and forms. In particular the invention concerns such a device wherein a read head apparatus such as a bar code scanning wand or the like is useable alternatively as a hand held scanner and as the read head of a slot reader, thereby precluding the need for two read heads for these two functions. The manual scanner is mountable in a receptacle in a housing which orients the read head for slot scanning, and removable from the receptacle for manual scanning. The invention is particularly useful in connection with terminals for validating lottery tickets and the like, for reading merchandise labels, for reading customer carried indicia such as credit cards, etc.

2. Prior Art

Devices are well known for reading data which is encoded on a data carrier such as a card, label sheet or article of merchandise. Without limitation, such data carriers are described herein as "forms". Readers are available to detect and to store or transmit optical or magnetic data on a form, and printers or writers are likewise available to record the data on the form. The data may be a representation of information as bar code, magnetic variations along a strip of ferromagnetic material, or characters of a type readable either by machines or by humans, such as optical character recognition data (OCR). These types of data encode information on tags attached to articles of merchandise, on bank checks, on credit cards, on lottery tickets and various other items. The data typically represents an indication of the identity of the article, its characteristics, or a unit of value associated with the article.

The encoded data typically is written linearly on the form, for example as a series of parallel lines in a bar code which vary in spacing, thickness or the like to encode the data. Similarly, magnetically induced variations in a ferromagnetic stripe can record data by their presence or absence, and printed characters in distinct shapes can be scanned and recognized as OCR data. In order to read a line of encoded data, either the data carrier or form is moved linearly past the head or heads of a data reader, or the data reader is moved linearly past the data carrier.

It is known to place the read heads of a data reader along the walls of a housing which defines a slot through which the form can be passed. The form rests against the bottom of the slot and thus positions the strip of data at a predetermined and repeatable orientation and spacing from the read head or heads of the data reader. The slot guides the data carrying part of the form past the data reader as the form is pushed manually through the slot. The form can also be moved automatically through the slot, or a plurality of successive forms can be fed through the reader by a suitable form feeder.

Hand-held data readers are also known. Typically a wand or pen-shaped device is manually moved along the line of encoded data, such scanning wands usually being adapted to bar code reading because the bar code does not require a particular orientation of the reader to the data carrier. Bar code readers are sometimes arranged to provide a scanning beam such that the read head is simply placed over the bar code and held there as the scanning beam is directed at the data carrying strip. Similar forms of readers can be used to detect OCR data or magnetically recorded data.

Hand-held data readers or "wands" communicate with a terminal through a wire, cord or the like, allowing a certain freedom of movement of the reader to effect manual scanning or positioning of the read heads relative to a form which is positioned at the user's convenience. Hand-held devices provide versatility for reading data carriers at a distance from the terminal, and it is generally quicker and easier to hand scan forms attached to articles, or to read each form in a group (e.g., stack) of forms, than it is to feed or position the forms to be read by a fixed data reader, as mounted in a slot.

Hand-held scanning devices are somewhat less dependable and less convenient for reading individual forms than sliding the forms through a slot reader. This is true, for example, because it takes two hands to wand a bar coded form but only one hand to slide the form through a slot. Hand held scanners may not read dependably if an optimum distance and angle of incidence with respect to the data carrier on the form is not maintained by the operator, and the operator must manually control the distance (usually by placing the read head directly against the form) and angle. A slot reader on the other hand is designed such that the optimum distance and viewing angle is maintained because the form is repeatably positioned by the inherent structure of the slot and the read head is fixed at an optimal position and angle in the slot. The slot reader can also have a form edge sensor for gating data only when a form is sensed to be present, and it is difficult to achieve a similar function in connection with a wand. In short, there are advantages to each type of reader, slot or wand. Known data input apparatus are sometimes provided with both a slot reader and a wand, or at least an input port to which a wand can be coupled is provided in addition to the slot reader.

The advantages and the shortcomings of the two types of readers can be appreciated in connection with typical functions of lottery agent terminals. The lottery agent when accepting or issuing single lottery entry forms to individual players will find a slot reader to be more convenient than a wand. The form need only be slid through the slot reader with one hand to dependably read the data, and at this phase in processing each form is handled separately. The agent may be required at times to deal with a stack of data, for example when receiving a stack of forms into inventory. Instead of unstacking, feeding and restacking the forms, it may be more convenient to turn up the edges of the forms in a stack and to scan them without unstacking them. Similarly, certain functions are possible which involve reading coded information apart from forms, or for reading coded information on non-standard forms, i.e., those for which the heads in the slot reader are not properly aligned. For these functions the wand is more convenient.

A retail clerk may also find both a wand and a slot reader to be useful. Tags attached to articles of merchandise cannot be readily run through a slot reader unless the tags are first removed from the merchandise or unless the merchandise is moved to the reader, both of which are undesirable. Therefore a wand is appropriate. On the other hand, customer forms such as credit cards, coupons and the like are most easily read using a slot reader.

The present invention provides a means to resolve the differences between fixed read head apparatus such as slot readers, and movable read head apparatus such as wands. Nevertheless, the full advantages of both types of readers are fully retained. A data reader is provided with a wand which is operable in a hand-held manner, and also is insertable into a receptacle in a housing which defines a slot for a form. The housing has engagement means that fix the wand in place with respect to the slot, including for example a fixed predetermined spacing of the wand input head from the form and a fixed optimal angle of orientation of the wand input head to the form. The receptacle fixes the wand in place to operate as dependably as a fixed input head in a slot reader. When desired, the operator can remove the wand from the receptacle in the housing, preferably by manually releasing a spring clip, and the wand is provided with a length of connecting cord allowing freedom of movement for hand scanning. When removed from the housing the wand is useful in the manner of a regular free moving wand. The invention thus provides the benefits of both types of scanning input means, but requires only one apparatus.

The device of the invention can be embodied as a feature of a terminal such as a point of sale terminal or lottery agent terminal, thereby adding movable wand capabilities to a device that formally was provided with a slot reader and separate wand or auxiliary wand input port. The invention can be embodied as an add-on housing to be attached externally to the housing of a terminal (or mounted as convenient on a nearby countertop, etc.) that formerly was provided only with movable wand input capability, thereby adding a slot reader function to the terminal. Additional variations will occur to persons skilled in the art who are made aware of the invention.

SUMMARY OF THE INVENTION

It is an object of the invention to provide a data reader which is optimally versatile for reading and recording data, by incorporating in a single reader the aspects of a fixed reader and a movable wand.

It is another object of the invention to provide a data reader wherein a scanning wand can be fixed in place adjacent a slot or the like, where the wand functions in the same manner as a fixed read head.

It is a further object of the invention to provide a data reader which is suitable for reading standard individual forms, batches of forms, and also forms which do not correspond to standard forms.

It is yet another object of the invention to provide wand reading capabilities in a device formerly having only slot reading capabilities, and vice versa, without incurring the expense of a second reader for the device.

These and other objects are accomplished by a device for reading data encoded on a form, with a removable scanning wand and a housing defining a slot for receiving the form. The wand functions as the input means of a slot reader when received in the housing, and is useful independently of the housing as a hand held scanning wand. The slot of the housing receives the form so as to position data on the form at a predetermined position and the wand is directed at the predetermined position when received in the housing. The wand, or other similar data read head can be sensitive to bar code, magnetic strips, OCR characters or the like, and is preferably positively positioned in the housing by a spring biased clip releasable by finger pressure. The wand can be coupled by a connecting lead to a further terminal apart from the housing, to which terminal the housing can preferably be attached to add a slot reader capability. Alternatively, the wand can be coupled by a connecting lead to a data discriminator in the housing, which data discriminator stores and/or transmits detected data to a further device.

The reader can include memory means for electronically storing the data, either local or remote, and means for electronic communication with the memory means. When the data reader is attached to the housing, data is readable by linearly moving the data carrier or form past the data reader. When the data reader is detached from the housing, the data is readable by linearly moving the data reader past the data carrier or form. By guiding the form relative to the data reader when the data reader is attached to the housing, the device has the advantages of a slot reader. By permitting the data wand to be removed for manual scanning functions, the device has the advantages of a manual scanning wand. The housing has engagement means for maintaining the data reader at a predetermined distance and angle to the slot. The engagement means may comprise a pivotal portion which is resiliently biased toward a stationary portion for releasably engaging the data reader.

BRIEF DESCRIPTION OF THE DRAWINGS

There are shown in the drawings the embodiments of the invention as presently preferred. It should be understood that the invention is capable of variations from the preferred embodiments, which are intended as illustrative rather than limiting. Reference should be made to the appended claims rather than the description of preferred embodiments in order to assess the scope of exclusive rights in the invention claimed. In the drawings.

DETAILED DESCRIPTION OF THE PREFERRED EMBODIMENTS

Figure 1:
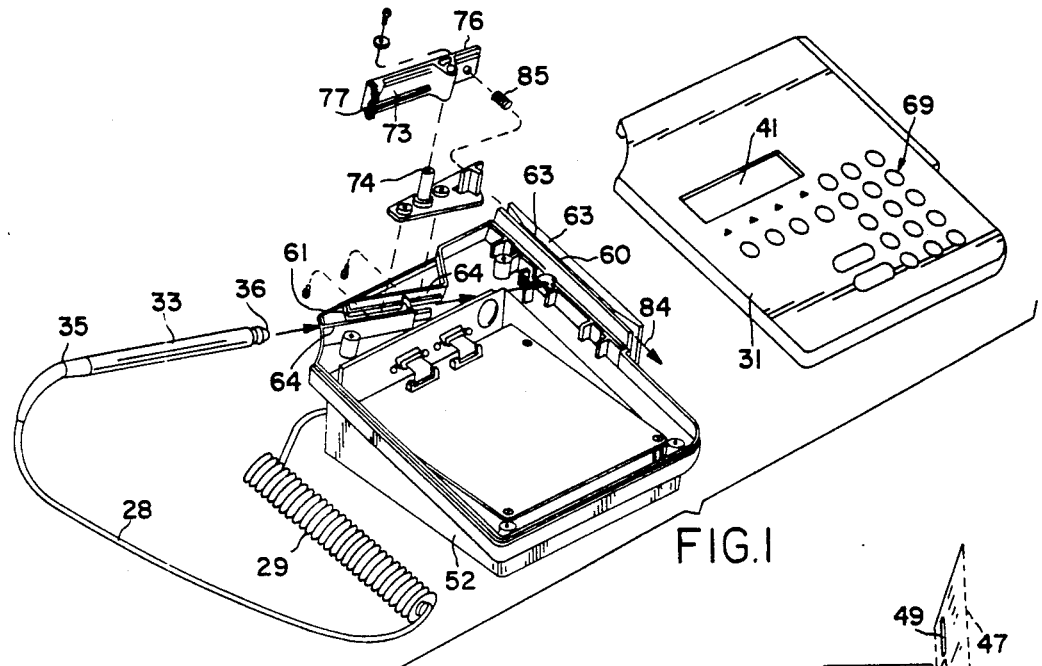
FIG. 1 is an exploded assembly view of a data terminal incorporating the data reader according to the invention, with the data scanning wand removed from its receptacle.

A device for reading data on a form 47 according to the invention is shown in the drawings with respect to two main embodiments. In the embodiment according to FIGS. 1-4, the invention involves a modified terminal such as a point of sale terminal, lottery agent terminal or the like, which includes an input port for a hand held scanning apparatus 33. The terminal housing 52 for the electronics of the terminal is provided with an alternative physical mounting for the scanning apparatus or data reader 33 by which the data reader becomes the read head of a slot reader. The data reader can be, for example, a bar code wand. The wand can be used either as a hand held scanning device, or mounted in a receptacle 61 in the housing of the terminal, adjacent a guiding slot 60 for the form. The wand receptacle 61 positions the data reader 33 at an optimum position for detecting data on a form which the user slides along the guiding slot, thereby rendering the wand, housing and associated electronics operable as a slot reader.

In the alternative embodiments according to FIGS. 5-9, the invention is arranged as a modification to an existing terminal. A physical housing 54 defining a guide slot 60 for a form 47 and a receptacle 61 for a data reader, is added onto an existing terminal which has an input port and associated electronics for servicing a scanning wand. According to these embodiments, the electronic communication means, terminal operation controls and the like, can be mounted in the same housing 52 defining the data reader receptacle 61 and form slot 60 (FIGS. 1-4), or in a different housing 54, which provides the physical mounting particulars for a data reader coupled to a terminal, as well as a guide slot for the forms.

The housing defining the data reader receptacle and guide slot for either type of unit is described generally herein a housing 51. The data reader 33 is preferably a bar code scanning wand, but can also be a read head adapted for sensing magnetically encoded data, optical character recognition characters (OCR), etc., wherein data is represented by variations in the optical or electromagnetic properties of a linear area along a form which are capable of being sensed by a read head. The variations occur substantially parallel to at least one edge of the form such that they pass in front of the read head as the form slides along the slot with the edge against the bottom of the slot.

Figure 4:
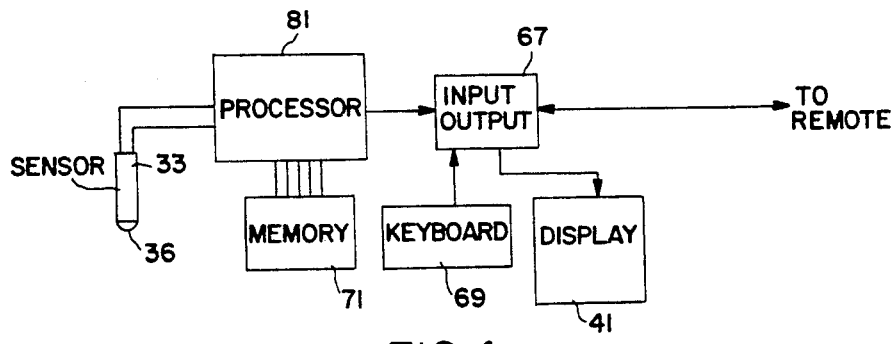
FIG. 4 is a schematic block diagram showing application of the invention to a data communication terminal.
Figure 5:
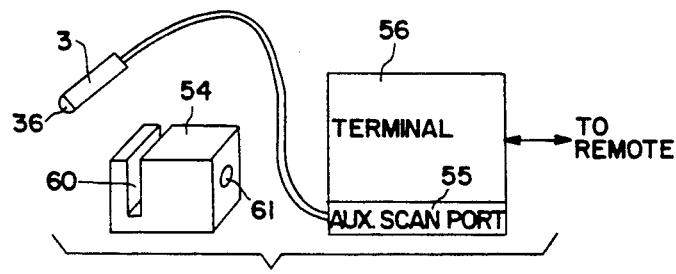
FIG. 5 is a schematic block diagram showing application of the invention to the auxiliary scanning port of an existing data communication terminal.
Figure 6:
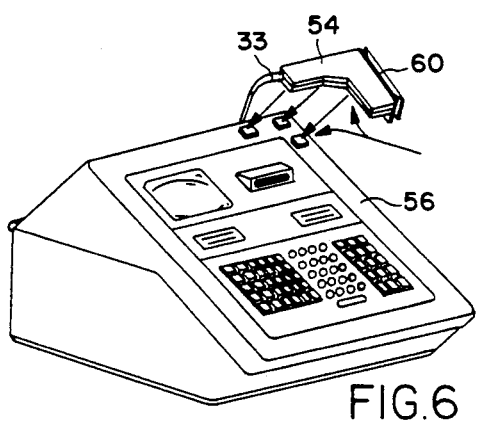
FIG. 6 is a perspective view illustrating a physical embodiment wherein the housing of the device forms a slot reader housing for mounting a scanning wand coupled to an existing terminal.

With reference to FIG. 4, the data reader 33 is coupled in data communication with a processor 81 or like apparatus operable to interpret a signal on the output of the data reader 33. The processor is coupled to appropriate memory means 71, including program memory and data storage capacity, and also to input/output means 67, which service the keyboard 69 and display 41 of a control panel 31. The input/output means are preferably operable under control of the processor to effect data communications with remote apparatus by a communication path, or alternatively the data can be stored on mass media for later use.

The terminal as a whole can be provided with various capabilities as required for the particular application. For example, and without limitation, the terminal can include in addition to the signal interpreting apparatus such features as an interface with a local network or remote data communications over telephone lines or leased lines, mass media storage, printers, display means, other forms of reading and writing apparatus, etc. The data reader 33 is preferably coupled to the signal interpreting apparatus by a connecting lead 28, which allows the data reader to be manipulated by a user within a range of movement permitted by the connecting lead. The connecting lead is preferably one or two feet in length, and as shown can be provided with a coiled section 29 to allow the wand or read head portion to be extended further by extending the coiled section, while keeping the connecting lead compact when it is not so extended. It is also possible to place the data reader 33 in communication with the apparatus for interpreting the signal by other means such as infrared communication signals (thereby not requiring a physical connecting lead), provided the data reader 33 is capable of sensing variations on the form 47 and communicating signals representing data on the form to the processor or similar apparatus which interprets the data.

Figure 2:
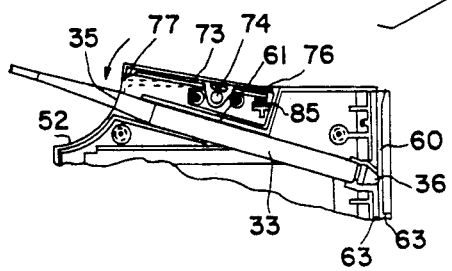
FIG. 2 is a partial section view thereof from above, with the data scanning wand in place in its receptacle.
Figure 3:
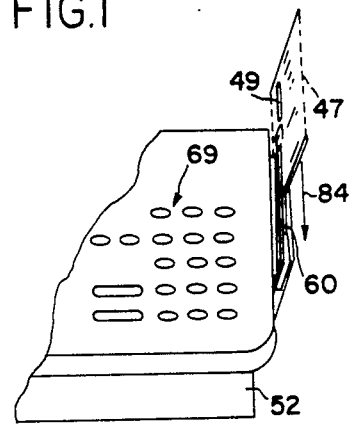
FIG. 3 is a partial front elevation view, with the device assembled and operating as a slot reader.

In addition to use as a hand held scanning device, data reader 33 is removably mountable to the housing 51 via a receptacle 61, shown in detail in FIGS. 1 and 2. The housing 51 has walls 64 that define the receptacle and are complementary to the data reader 33. The walls 64 are positioned and oriented relative to a slide path 84 for the form such that the optical, magnetic or other read head input means are optimally placed to detect data on the form 47. For a bar code scanner or the like, the scanning wand can be placed such that the optical head 36 thereof is coplanar with the inner surface of one of the walls 63 defining the guide slot 60, and preferably angled slightly relative to perpendicular to the slot, for example at about 85° to the plane of the form 47 as it slides through the guide path. The read head is disposed at a predetermined height relative to the bottom of the guide slot so as to center the read head on the strip of data to be detected on the form. The height can be made adjustable, or preferably the slot bottom structure is mountable at alternative heights (for example by providing alternative bases for the slot or alternative screw holes for attaching the slot structure relative to the portion of the housing having the read head) for reading coded data of various heights on different types of forms. For example, the reader can be arranged such that the slot structure is alternatively settable for reading bar codes with centerlines located at 0.250, 0.350, 0.450, 0.650 and 0.835 inch from an edge of the form, thereby accommodating standard lottery ticket forms and the like. By providing a convenient structure for removing and replacing one or both walls defining the slot, a means is provided to relocate the bottom portion of the slot or to access the inside of the slot for cleaning. The slot can be provided with a resilient abutment bearing inwardly to intercept the form path, the abutment being passable by the form but providing a tactile indication due to friction such that the operator can feel the location of the form in the slot as it passes the read head. In this connection the sensor end of the read head can protrude slightly into the slot providing such a tactile indication, and the engagement means holding the read head can have sufficient resilient give to permit the form to be passed upon forcing the read head back slightly using the form.

A manually releasable engagement means is provided for holding the data reader 33 in operable position in the receptacle 61, and for allowing the data reader to be removed from the receptacle for use as a manually positioned scanning apparatus. The engagement means in the embodiment shown comprises standing flanges defining sidewalls and a cradle for the data reader 33, which is cylindrical, and a pivotal member 73, resiliently biased to bear inwardly against the data reader in the receptacle. The pivotable member has an end portion 77 which in part defines the slot dimensioned for complementary engagement with the data reader 33, for example engagement at a reduced diameter portion 35 of an elongated bar code scanning wand. The end portion 77 preferably engages at a lip or flange on the wand and thus prevents any substantial displacement of the wand from its optimal position for slot reading. When the wand is removed and the pivotal member is released, the outer side of the pivotal member resides substantially in the plane of the outer surface of the housing.

The engagement means includes a spring 85 that urges the pivotable member into engagement with the wand. The pivotable member has an externally accessible portion 76, for example the end of the tab opposite from the engaging end 77 with respect to the pivoting axis 74, by which the user can lift the engaging end from the wand by finger pressure on the finger tab end 76, allowing the wand to be freely withdrawn from its receptacle 61. The pivotal member and spring are carried on a base plate as shown in FIG. 1 that can be attached onto an internal panel in the housing using screws and has a post defining the pivot axis.

The housing 51 has two walls 63, spaced to guide the data carrier accurately relative to the sensing head 36 of the data reader 33 when the data reader is attached to the housing. For paper or card stock forms such as merchandise labels, tickets, bank notes, credit cards, lottery forms and the like, the walls 63 are simply parallel walls spaced just slightly more than the thickness of the form (typically 0.004 to 0.012" for lottery forms) such that the form slides freely in the slot. The slot need not be longer than the form edge, but should be a substantial proportion of the edge length in order to render the form stable when moving through the slot. The wall 63 on the side of the data reader is provided with a hole, transparent panel or the like, through which the data read head 36 can view the data bearing area of form 47 as it is moved linearly past. Similarly, when the data reader is detached from the housing, the data is readable by linearly moving the data reader past the data carrier.

Figure 7:
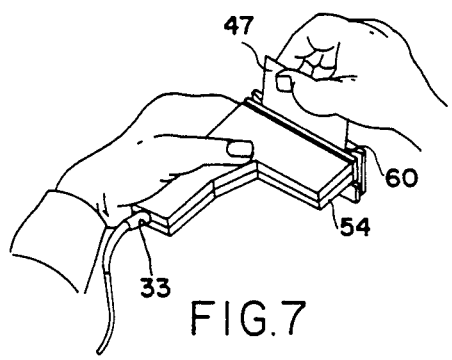
FIG. 7 is a perspective view illustrating the use of the invention as a hand held slot reader.
Figure 8:
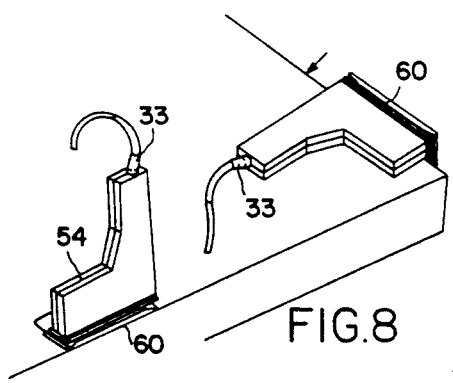
FIG. 8 is a perspective view showing two orientations of the slot reader relative to a counter; and, FIGS. 9 is a perspective view illustrating alternative location of the reader on a terminal such as a lottery agent or point of sale terminal.
Figure 9:
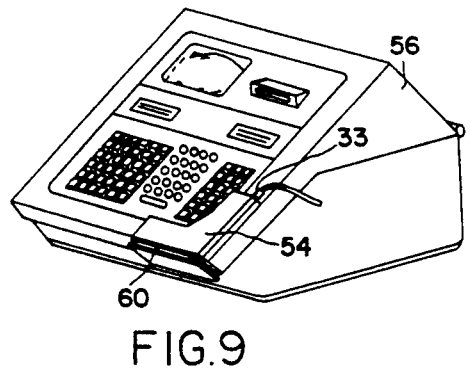

Point of sale terminals, lottery agent terminals and the like which are already provided with a hand scanner, or at least an auxiliary input by which a hand scanner can be coupled to the terminal, can also be fitted according to the invention. As shown in schematic form in FIG. 5, a terminal with a data reader interface 55 can be provided with a structure having a receptacle 61 for the scanner wand 33, and a slot 60 for a form. Such a device can be attached to the housing 52 of the terminal at any location within the span of the connecting lead 28 coupling the scanner wand to the interface therefor, for example at the top or side of the housing using hook and pile (Velcro) fasteners as in FIGS. 6 and 9, or at any convenient location such as a tabletop as in FIG. 8. Furthermore, it is readily possible to arrange for mounting the slot structure to accommodate different users of the terminal 56 such as left handed or right handed persons, as well as persons whose preferences for use of the device may vary. As shown in FIG. 7, it is further possible to avoid attaching the slot structure to any particular mounting, and to use it as a hand scanning apparatus wherein the wand receptacle and the guide slot for the form are arranged for more dependable and easier data reading than would be possible if the form was guided past the scanner without any means of guidance.

The invention as disclosed herein is a device for reading data encoded on a form 47, comprising a housing 51 having means 60 to receive the form 47 so as to position the data 49 on the form at a predetermined position relative to the housing, the housing including a positioning apparatus 61. A data read head 33 is removably attachable to the housing 51 by said positioning apparatus 61, the data read head 33 having an output coupled to a connecting lead 28 for communicating with an apparatus 81, 56, etc., for interpreting data on the output. The data read head 33 is oriented toward the predetermined position of the data 49 on the form 47 when attached to the housing 51 by the positioning apparatus 61, whereupon the data read head is oriented to read forms at the predetermined position. The data read head 33 is releasable from the positioning apparatus 61, whereupon the data read head 33 is freely manually positionable to read forms positioned within a span defined by the connecting lead 28.

The housing 51 includes means 60 for guiding the form 47 relative to the data reader 33 so as to pass the data 49 on the form 47 over the predetermined position, for forms the guiding means 60 is preferably a slide slot.

The positioning apparatus 61 positively fixes the data reader 33 in position relative to the predetermined position of the data 49, with respect to at least one of distance from the predetermined position and angular orientation relative to a plane defined by the form. The data reader 33 is preferably shaped as an elongated wand and the positioning apparatus defines a complementary receptacle for the wand.

A spring biased body 73 is resiliently biased relative to the receptacle 61 for the wand. The spring biased body 73 bears against the wand 33 for positively positioning the data reader relative to the predetermined position of the data. The spring biased body 73 can be pivotally mounted on an axis 74, along the receptacle 61 for the wand 33. A first end 77 of the spring biased body bears against the wand when in place in the housing, and a second end 76 of the spring biased body opposite the axis from the first end is accessible from an exterior surface of the housing 51 for lifting the first end from engagement against the wand.

The data reader can be sensitive to data encoded on the form as at least one of bar code, magnetic variation along a ferromagnetic strip, and optical character recognition (OCR) code. The housing can be the casing of a terminal in data communication with the data reader. Alternatively, the housing can be a stand alone enclosure, with interface means for coupling the connecting lead to a data reader input port of a terminal apparatus.

The housing can be mounted to any surface in a range of movement of a data read head 33 of a terminal, with the data reader and the connecting lead coupled to the terminal, whereby the data reader housing forms a slot reader mounting for the terminal.

The invention can be more particularly defined as a slot reader with a housing 51 defining a slide path 84 for a form 47, the slot reader housing 51 having a receptacle 61 for a data reader wand 33, positioning the data reader wand to orient the sensor head 36 thereof toward a data position 49 of a form passing along the slide path 84. The receptacle structure includes means 73, 77 for holding the data reader wand 33 in position and means 73, 76 for releasing the data reader wand 33 from the slot reader housing 51 for use independently of the housing. The means for holding or releasing the data reader wand 33 can include a pivotable locking tab 73 and a spring 85 for biasing the locking tab to engage the data reader wand when in position. The locking tab can include a manually engageable part 76 whereby the locking tab is liftable from engagement with the data reader wand for releasing the data reader wand 33.

A number of further variations are possible. A detector switch such as a limit switch can be operably arranged relative to the wand 33 or to the locking tab 73 to sense whether the data reader wand is in position, and/or a form edge sensor can be provided to detect the leading edge of a form in the slot. The form edge sensor enables reading when the detector switch senses that the data reader wand is in position for reading a form in the slot, and can gate data from the read head for a time after passage of the leading edge or only when a form is in place. The data reader wand can be coupled to a data discrimination apparatus 81, 56, etc., for communicating the data to a further terminal, for example on a dial up telephone line or the like. The data reader wand can be coupled to the same housing defining the receptacle for the wand and the guide slot, or coupleable to a data discrimination apparatus in a further terminal.

The invention is particularly applicable to embodiment as a bar code reader, but can also be arranged to read other forms of data such as magnetic strip data, OCR characters and the like. In connection with an embodiment wherein the rotational orientation of the data reader 33 around its axis of elongation is important, for example with OCR characters, the data reader can be made engageable with the receptacle at the required orientation only, for appropriate viewing of the form as it passes along the slide path.

The invention is applicable generally to point of sale apparatus, and is particularly applicable to a point of sale device for the on-line validation of lottery game entries, and the on-line control of gaming and wagering terminals. The invention is also applicable to off-line sale or control of inventory in gaming systems and other applications wherein it is convenient to input data such as identity designations, player number choices or other indicia which may be encoded on a form. In the preferred embodiment the point of sale terminal is arranged with a display, keyboard, printer, audible signalling device and mark sense ticket reader as well as the scanner for reading forms in a slot as well as hand held forms. The apparatus can be coupled to a network for on-line communications, or used to accumulate data for uploading. In application as a ticket validation device, the apparatus can be arranged to communicate with a central lottery computer, for example by radio or telephone data communication paths, such that a lottery agent can automatically validate entries, check returned entries presented as winners against stored lottery data.

We claim:

1. A device for reading data encoded on a form, comprising:
   a housing having means to receive the form so as to position the data on the form at a predetermined position relative to the housing, the housing including a positioning apparatus:
   a data read head removably attachable to the housing by said positioning apparatus, the data read head having an output coupled to a connecting lead for an apparatus for interpreting data on the output, the data read head being oriented toward the predetermined position of the data on the form when attached to the housing by the positioning apparatus, whereupon the data read head is oriented to read forms at the predetermined position, and wherein the data read head is releasable from the positioning apparatus, whereupon the data read head is freely manually positionable to read forms positioned within a span defined by the connecting lead, the housing being a casing of a terminal in data communication with the data read head.

2. The device for reading data according to claim 1, wherein the housing includes means for guiding the form relative to the data read head so as to pass the data on the form over the predetermined position.

3. The device for reading data according to claim 2, wherein the means for guiding the form includes means defining a slot for the form.

4. The device for reading data according to claim 3, wherein the positioning apparatus positively fixes the data read head in position relative to the predetermined position of the data, with respect to at least one of distance from the predetermined position and angular orientation relative to a plane defined by the form.

5. The device for reading data according to claim 1, wherein the data reader is sensitive to data encoded on the form as at least one of bar code, magnetic variation along a ferromagnetic strip, and optical character recognition (OCR) code.

6. The device for reading data according to claim 1, wherein the housing is a stand alone enclosure, and further comprising means for coupling the connecting lead to a data reader input port of a terminal apparatus.

7. The device for reading data according to claim 6, further comprising means for affixing the housing to a surface in a range of movement of a data read head of a terminal, and wherein the data reader and the connecting lead are coupled to the terminal, whereby the data reader housing forms a slot reader mounting for the terminal.

8. A device for reading data encoded on a form, comprising:
   a housing having means to receive the form so as to position the data on the form at a predetermined position relative to the housing, the housing including a positioning apparatus;
   a data read head removably attachable to the housing by said positioning apparatus, the data read head having an output coupled to a connecting lead for an apparatus for interpreting data on the output, the data read head being oriented toward the predetermined position of the data on the form when attached to the housing by the positioning apparatus, whereupon the data read head is oriented to read forms at the predetermined position, and wherein the data read head is releasable from the positioning apparatus, whereupon the data read head is freely manually positionable to read forms positioned within a span defined by the connecting lead, the data read head being shaped as an elongated wand and the positioning apparatus defining a complementary receptacle for the wand, and wherein the positioning apparatus includes a spring biased body resiliently biased relative to the receptacle for the wand, the spring biased body bearing against the wand for positively positioning the data reader relative to the predetermined position of the data.

9. The device for reading data according to claim 8, wherein the spring biased body is pivotally mounted on an axis, along the receptacle for the wand, a first end of the spring biased body bearing against the wand when in place in the housing, and a second end of the spring biased body opposite the axis from the first end being accessible from an exterior surface of the housing for lifting the first end from engagement against the wand.

10. A slot reader with a housing defining a slide path for a form, the slot reader housing having a receptacle for a data reader wand, the receptacle positioning the data reader wand toward a data position of the form when passing along the slide path, the receptacle including means for holding the data reader wand in position and means for releasing the data reader wand from the slot reader housing for use independently of the housing, and wherein said means for holding the data reader wand and the means for releasing the data reader wand include a pivotable locking tab and a spring for biasing the locking tab to engage the data reader wand when in position.

11. The slot reader according to claim 10, wherein the locking tab includes a manually engageable part whereby the locking tab is liftable from engagement with the data reader wand for releasing the data reader wand.

12. The slot reader according to claim 10, wherein the data reader wand is positioned resiliently when in the receptacle to extent at least part way across said slide path, and is retractable upon passing of the form, thereby providing a tactile indication of a position of the form in the slide path.

13. The slot reader according to claim 10, further comprising a data discrimination apparatus coupled to the data reader wand, and wherein the data discrimination apparatus includes means for communication the data to a further terminal.

14. The slot reader according to claim 10, wherein the data reader wand is directly coupleable to a data discrimination apparatus in a further terminal.

15. A data terminal including a bar code reader that is alternatively useful as a slot reader and a handheld wand reader, the data terminal having a housing with a slot defining a slide path for a form, the housing having a receptacle for a bar code reader wand coupled to the data terminal by a lead, said wand being removable from the receptacle for manually scanning the wand over forms, and mountable in the receptacle for reading forms passing through the slide path, the receptacle receiving and orienting the bar code reader wand toward a data position of the form when passing along the slide path, the receptacle including means for holding the bar code reader wand in position and means for releasing the bar code reader wand from the housing for use independently of the housing.

* * * * *